United States Patent [19]

Kawamura

[11] 4,180,043

[45] Dec. 25, 1979

[54] CODE LOCK TYPE ENGINE CONTROL SYSTEM

[75] Inventor: Michio Kawamura, Kariya, Japan

[73] Assignee: Nippondenso Co., Ltd., Kariya, Japan

[21] Appl. No.: 802,864

[22] Filed: Jun. 2, 1977

[30] Foreign Application Priority Data

Jul. 1, 1976 [JP] Japan .................................. 51-78571

[51] Int. Cl.$^2$ ............................................. B60R 25/04
[52] U.S. Cl. ............................. 123/146.5 B; 180/287; 307/10 AT; 340/64
[58] Field of Search ..................... 123/198 B, 146.5 B; 180/114; 340/63, 64; 307/10 AT

[56] References Cited

U.S. PATENT DOCUMENTS

| 3,553,494 | 1/1971 | Fuess | 123/146.5 B X |
| 3,675,036 | 7/1972 | Davies | 123/146.5 B |
| 3,720,284 | 3/1973 | Myers | 123/146.5 B |
| 3,756,341 | 9/1973 | Tonkowich | 123/198 B X |

*Primary Examiner*—Ira S. Lazarus
*Attorney, Agent, or Firm*—Cushman, Darby & Cushman

[57] ABSTRACT

In a packaged electric part for controlling the operation of an engine, is provided a switching circuit which is turned on to let the electric part operative when and only when an inputted code coincides with a preliminarily set code. The coincidence of the codes is checked in a logical checkup circuit. The switching circuit is integrated within the electric part. Therefore, the thief-proof lock of an automobile can be greatly improved very much.

4 Claims, 7 Drawing Figures

CODE LOCK TYPE ENGINE CONTROL SYSTEM

BACKGROUND OF THE INVENTION

1. FIELD OF THE INVENTION

This invention relates to a thiefproof engine lock system in an automobile and more particularly to an engine control device having a check function for controlling the operation of an engine of an automobile on the result of the code checking.

2. DESCRIPTION OF THE PRIOR ART

Conventionally, an engine of an automobile is started by closing an ignition switch with an ignition key and thereby actuating the ignition system of the engine. Here, the ignition key is a mechanical key. Therefore, even if the pattern of the key is designed to be very complicated, the variation is limited and it is possible to start the engine of any automobile easily with some basic types of keys. Further, even without any ignition key, when the battery is directly connected to the ignition coil and to the starter motor of an automobile, the engine of the automobile can be started. Therefore, only with an ignition key type locking system, there remains a possibility that the automobile may be stolen.

SUMMARY OF THE INVENTION

This invention is intended to remove the above drawback of the prior art and, therefore, an object of this invention is to provide an engine control system having checkup function capable of securely preventing the actuation of an engine by an improper operation.

Another object of this invention is to provide an engine control system having a code checkup function capable of allowing the actuation of an engine when and only when a predetermined code is inputted properly.

According to an aspect of this invention, the above objects can be achieved by integratedly providing a checkup circuit constituting a switching means within an electric part for controlling the operation of an engine, the checkup circuit checking up the inputted code with a predetermined set code and changing over an electric path in the electric part from non-operative to operative state upon the coincidence between the codes.

According to the above feature of this invention, the actuation of an engine can be allowed when and only when an inputted code coincides with a predetermined set code. Further, since the switching means having the above checkup function is integrated within the electric part, the installing thereof is simple and easy and the improper actuation of the engine can be securely prevented.

DESCRIPTION OF THE PREFERRED EMBODIMENTS

Figure 1:
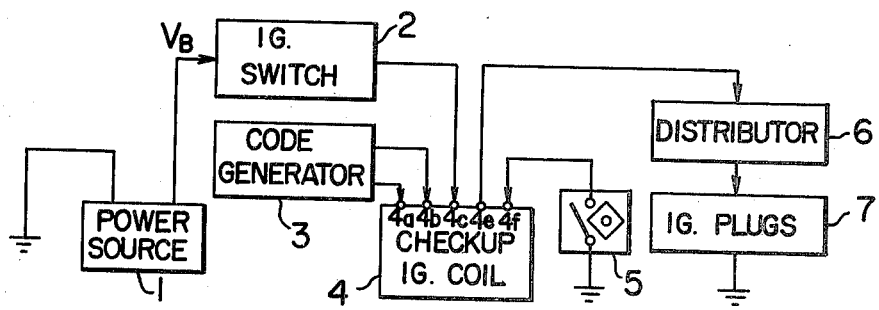
FIG. 1 is a block diagram of an engine control system having a checkup function according to an embodiment of this invention.

FIG. 1 shows an overall structure of an engine control system according to an embodiment of this invention, in which reference numeral 1 denotes a power source such as a storage battery or a generator, 2 an ignition switch for turning on and off the power supply from the source 1 to the ignition system and other electric parts, 3 a code generator for inputting an input code by a driver with manual operations, and 4 an ignition coil having a chekup function. The ignition coil circuit 4 has terminals 4c, 4a and 4b for receiving power from the power source 1 through the ignition switch 2, a data signal of the input code from the code generator 3, and a clock signal from the code generator 3, respectively. A breaker 5 is driven by the engine and intermittently connects the ground terminal 4f of the ignition coil 4 to the ground. Block 6 is a distributor connected to the high tension terminal 4e of the ignition coil 4, and 7 ignition plugs connected to the distributor 6.

Figure 2A:
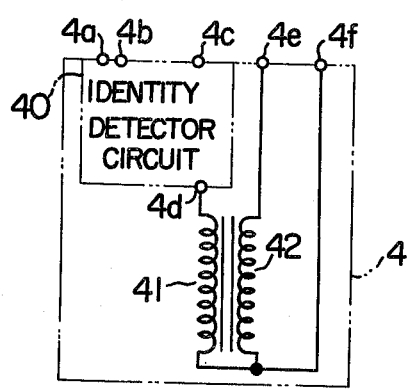
FIGS. 2A and 2B are a schematic electric connection diagram and a partial cross-sectional diagram of an ignition coil circuit having a checkup function.
Figure 2B:
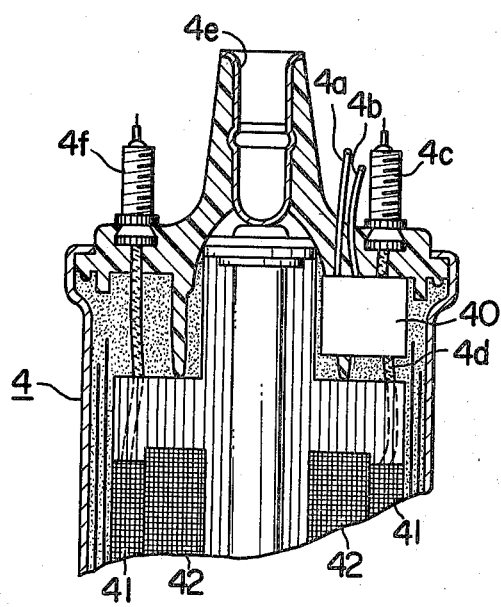

FIGS. 2A and 2B show a detailed structure of the checkup ignition coil circuit 4, in which numeral 40 denotes an identity detector circuit provided with the terminals 4a and 4b connected to the respective output terminals of the code generator 3 to receive the data signal and the clock signal. Further, the identity detector circuit 40 is provided with the primary terminal 4c to which the source voltage is supplied. A primary coil 41 is connected to a power output terminal 4d of the identity detector circuit 40. A secondary coil 42 for generating the high ignition voltage is connected to the high tension terminal 4e. The other ends of the primary and secondary coils 41 and 42 are connected in common to the ground terminal 4f of the ignition coil circuit 4. The identity detector circuit 40 checks as to whether the input code arriving from the code generator 3 coincides with the preset code. When the input code coincides with the preset code, the electric power supply path from the primary terminal 4c to the power output terminal 4d is switched from the open state to the closed state to enable the operation of the engine. Namely, the identity detector circuit 40 constitutes a switch means for switching the electric path of the ignition coil which forms an electric function part from the non-operative state to the normally operative state when the input code coincides with the preset code.

Figure 3A:
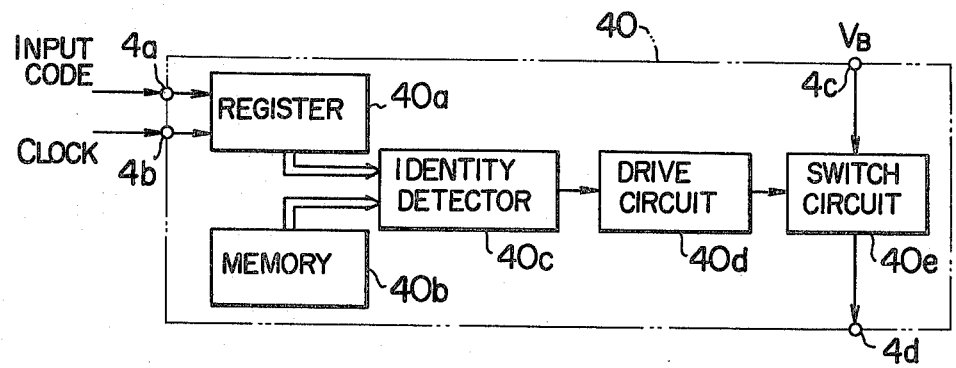
FIGS. 3A and 3B are a block diagram and an electric connection diagram of an example of the checkup circuit of FIGS. 2A and 2B.

FIG. 3A is a block diagram showing a detailed structure of the identity detector circuit 40 of FIGS. 2A and 2B. The identity detector circuit 40 shown in FIG. 3A includes an input code register 40a for temporarily storing the data signal which is supplied in synchronism with the clock signal, a memory circuit 40b for storing a set code preliminarily determined for each automobile, an identity detector 40c for checking whether the codes in the register 40a and the memory 40b are identical or not, and a driver circuit 40d for driving a switching circuit 40e of the next stage to be closed upon reception of the identity signal from the identity detector 40c which represents the coincidence of the input code with the preset code. When this switching circuit 40e is closed, the current path to the primary coil is switched from the non-operative (off) to the normally operative (on) state.

Figure 3B:
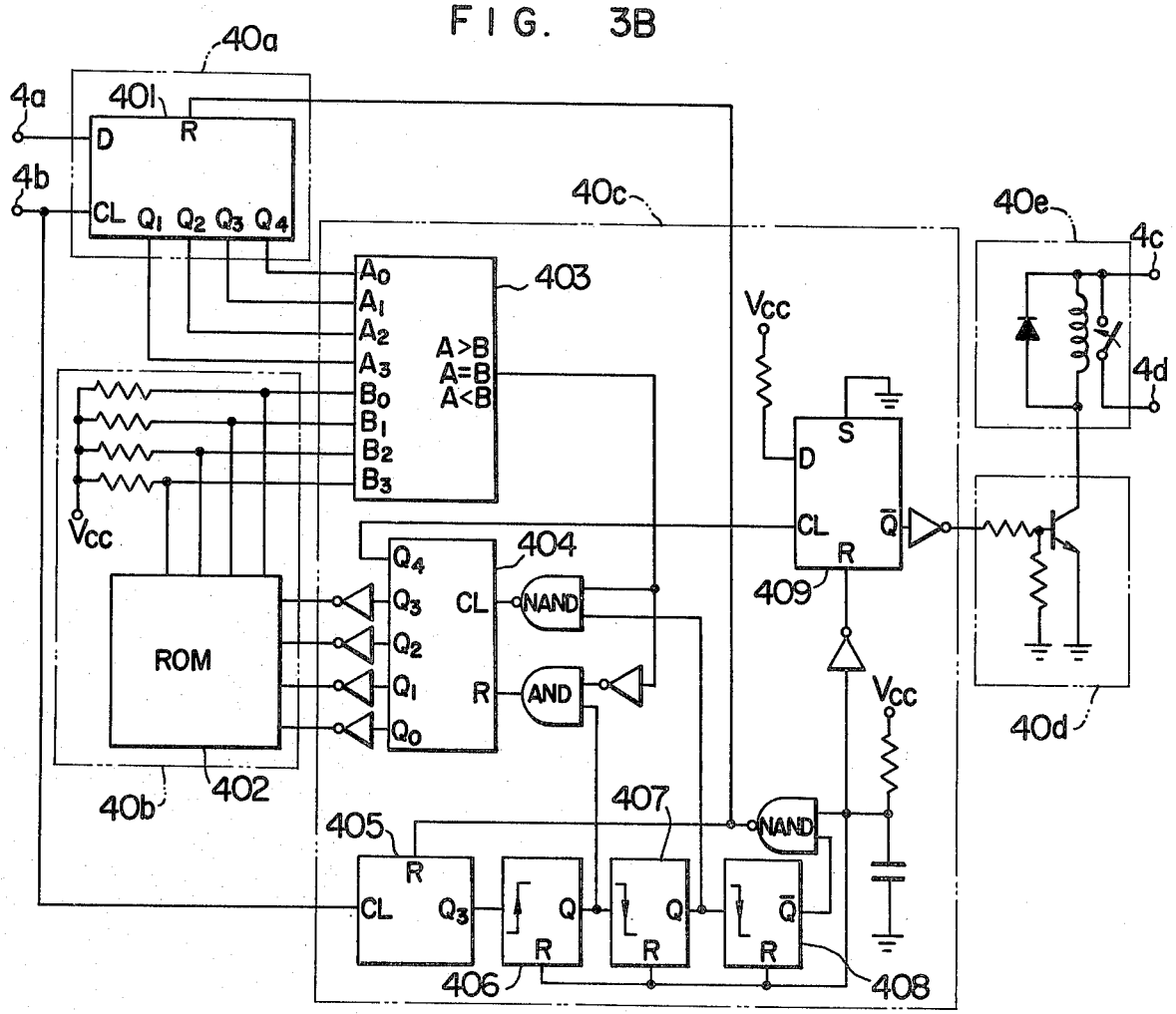

Further details of each component of the circuit of FIG. 3A are shown in FIG. 3B. The register 40a is formed of a shift register 401 and the memory circuit 40b is formed of a read-only-memory (ROM) 402 and a group of pullup resistors. The identity detector circuit 40c comprises a digital comparator 403, a decade counter 404, a binary counter 405, monostable multivibrators 406, 407 and 408, a data flip-flop 409 and various logic gates. The driver circuit 40d and the switching circuit 40e have well-known structures. A constant voltage $V_{cc}$ is supplied to the respective elements simultaneously with the throwing-in of the ignition switch 2. This arrangement is designed for the case when the input code is a four-digit number. The identity detector circuit 40c detects the coincidence of the input code with the preset code, digit by digit.

First, when the voltage $V_{cc}$ is supplied, the respective elements are reset and only the $Q_o$ output of the decimal counter 404 becomes "1". An address in the ROM 402 is designated thereby. In correspondence with the firstly designated address, the ROM 402 supplies the first digit of the stored preset code in 4-bit from to the inputs B of the degital comparator 403. On the other hand, when the first digit of the input code is supplied to the shift register 401, it is shifted in the register sequentially in synchronism with the clock signal. When four clock pulses are supplied, the first digit is supplied from the shift register 401 to the inputs A of the digital comparator 403 as a binary 4-bit code. When the two inputs A and B, each of 4 bits, of the digital comparator 403 coincide each other, the output of the comparator (A=B terminal) becomes "1." The clock signal is also supplied to a binary counter 405. When the count of the clock signal becomes four, the output $Q_3$ thereof becomes "1" and a monostable multivibrator 406 is triggered. The monostable multivibrator 406 then triggers another monostable multivibrator 407 which then triggers another monostable multivibrator 408. When the digital comparator 403 is generating "1" as described above, the pulse generated from the monostable multivibrator 407 is allowed to pass through the NAND gate and is inputted to the clock terminal CL of the decade counter 404. As the outputs $Q_1$, $Q_2$, $Q_3$ of the decade counter 404 becomes "1" sequentially, the detection of the coincidence of the second, third and fourth digit of the input code with those of the preset code is carried out in the same manner as described with regard to the first digit. When the coincidence detection of the fourth digit has terminated, the output $Q_4$ of the decade counter 404 becomes "1", and the data flip-flop 409 generates "0" at the output $\overline{Q}$ which is inverted to "1" by an inverter. This "1" signal turns on the transistor of the driver circuit 40d to allow the electric current to flow through the relay in the switching circuit 40e. Thus, the contacts of the relay are closed to electrically connect the terminals 4c and 4d.

Now, the overall operation of the above arrangement will be described hereinbelow. First, the ignition switch 2 is thrown in and the code generator 3 is manipulated by a driver to generate an input code. The input code is temporarily stored in the register 40a of the checkup circuit 40. Then, the identity detector circuit 40c checks and discriminates whether the input code temporarily stored in the register 40a is identical with the preset code in the memory circuit 40b which is predetermined to be unique to each automobile. When the input code coincides with the preset code unique to the automobile as the result of the checking discrimination in the identity detector circuit 40c, the identity detector 40c generates a coincidence signal to the driver circuit 40d. The driver circuit 40d closes the switching circuit 40e upon reception of the coincidence signal from the identity detector 40i c. Thus, a current is supplied to the primary coil of the ignition coil 4. Thereby, when the engine is started by a starter (not shown), the ignition coil 4 generates high ignition voltage across the secondary coil 42 in synchronism with the opening of the breaker 5. The high voltage is supplied from the secondary high voltage terminal 4e through the distributor 6 to the ignition plugs 7 to control the ignition of the engine and normally operate the engine.

On the other hand, when the input code from the code generator 3 does not coincide with the preset code, the input code temporarily stored in the register 40a does not coincide with the preset code in the memory 40b and hence the identity detector 40c does not generate any coincidence signal. Therefore, the driver circuit 40d is not actuated and the switching circuit 40e is held open. Thereby, no current is supplied to the primary coil 41 of the ignition coil 4 and no high voltage is generated across the secondary coil 42. The ignition coil 4 is held in non-operative state. Even when the starter (not shown) is actuated to start the engine in this state, the engine never begins operation since the igniting circuit does not work. Therefore, the above structure is very effective for preventing theft. Here, the checkup circuit 40 is integratedly provided within the ignition coil housing and sealed with a cover. Thus, the improper switching of the ignition unit into the normally operative state without inputting a preset code in a code generator can be securely prevented.

Figure 4:
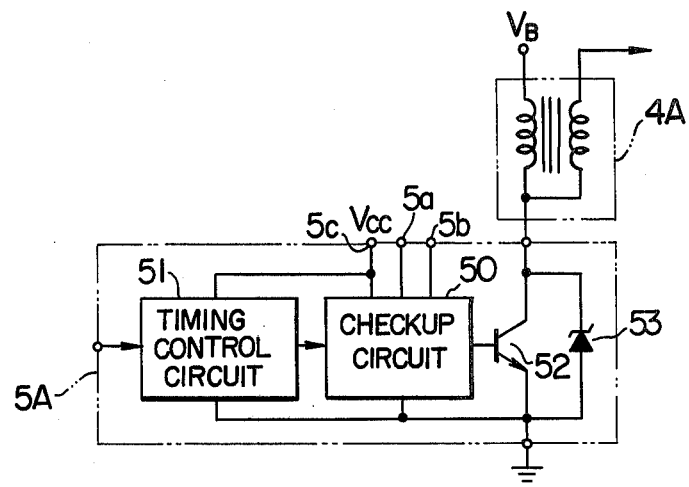
FIG. 4 is a partial electric connection diagram of an engine control system according to another embodiment of this invention.

FIG. 4 shows another embodiment, in which a checkup circuit is integratedly formed within a transistor type breaker 5A which is packaged and also forms an electrical function part. In the figure, numeral 4A denotes an ordinary ignition coil having the ground terminal connected to the transistor type breaker 5A. A checkup circuit 50 has terminals 5a, 5b and 5c applied with the data signal of the inputted code, the clock signal, and the electric power, respectively. When the inputted code coincides with a preset code, the checkup circuit 50 establishes the electric conduction path from the input to the output terminal. The checkup circuit 50 may have almost similar structure to that of FIG. 3. In this case, the driver circuit 40d and the switching circuit 40e are replaced with a gate which opens the gate to allow the transmission of a signal when the input code coincides with the preset code. A timing control circuit 51 shapes the waveform of detection pulses supplied from an electromagnetic pickup (not shown) and indicating the ignition timing, and generates ignition pulses at the proper timing of ignition. An output transistor 52 is arranged to be turned off to stop the current flow through the primary coil of the ignition coil when the ignition signal arrives through the checkup circuit 50. High ignition voltage is generated across the secondary coil of the ignition coil 4A upon the turning-off of the output transistor 52. A Zener diode 53 protects the transistor 52.

According to the above structure, when the input code does not coincide with the preset code, the checkup circuit 50 is cut off to prevent the transmission of the ignition signal therethrough. Thus, the transistor type breaker 5A is held in the non-operative state and the output transistor 52 does not perform the breaking operation. Thus, the ignition coil 4A never generates high ignition voltage and the engine does not work. Thus, the automobile carrying the above system can be prevented from theft by those who do not know the preset code.

When a proper driver who knows the preset code inputs the correct code to the checkup circuit 50, the input code coincides with the preset code and the checkup circuit 50 is switched from the cut-off state to the turned-on state. Then, the ignition signal from the timing control circuit 51 synchronized with the rotation of the engine transmits through the checkup circuit 50 and is applied to the output transistor 52 to achieve the breaking operation. The high ignition voltage is generated from the ignition coil 4A each time when the output transistor 52 is turned off. Thus, the engine can be driven to run.

Figure 5:
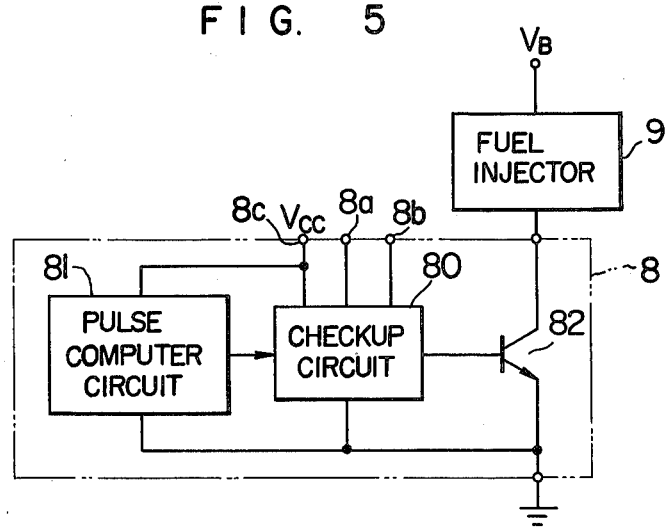
FIG. 5 is a partial electric connection diagram of an engine control system according to a further embodiment of this invention.

FIG. 5 shows another embodiment, in which a checkup circuit is integratedly packaged within an electronic fuel injection control circuit 8 which forms also an electric function part. In the figure, a fuel injector valve 9 supplies fuel into the engine by injection and is connected to the electronic fuel injection control circuit 8. A checkup circuit 80 has input signal terminals 8a and 8b applied with a data signal of the inputted code and the clock signal respectively, and a power source terminal 8c. When said inputted code coincides with the preset code, the electric path between the input and the output is switched from the off state to the on state, similar to the preceding embodiments. An injection pulse computer circuit 81 computes the fuel injection quantity in response to the various operational parameters of the engine and generates injection pulses having a pulse width responding to the computed injection quantity, in synchronism with the rotation of the engine. An output transistor 82 is turned on to open the fuel injection valve 9 when a fuel injection pulse arrives through the checkup circuit 80, thereby controlling the fuel injection.

According to the above structure, when the input code does not coincide with the preset code, the checkup circuit 80 is held in the off state to block the injection pulses from the injection pulse computer circuit 81. Thereby, the output transistor 82 is held to be turned off. The fuel injection valve 9 never opens, no fuel is supplied to the engine, and the engine never works. Thus, theft of the automobile carrying the above system by those who do not known the preset code can be prevented.

When a proper driver who knows the preset code inputs the correct code to the checkup circuit 80, the input code coincides with the present code and the checkup circuit 80 is switched from the off state to the on state. Then, the injection pulse from the injection pulse computer circuit 81 synchronized with the rotation of the engine transmits through the checkup circuit 80 and is applied to the output transistor 82. The fuel injection valve 9 is opened to supply fuel each time when the output transistor is turned on. Thus, the engine is brought into the operative state.

In the above embodiments, there may be provided other means such as alarm means which generates an alarm sound when the input code does not coincide with the preset code.

What is claimed is:

1. An engine control system having an input code checkup function comprising:
   an electric power source;
   electric actuating means coupled with an engine and available for rotating said engine during the energization thereof by said electric power source;
   control means connected to said electric actuating means for generating a control signal in response to which said electric actuating means is allowed to be energized; and
   checkup means integrally packaged within said control means for comparing an input code signal with a predetermined constant code signal, said checkup means allowing said control means to generate said control signal only when said input code signal is detected to be identical with said constant code signal, said checkup means including a register for temporarily memorizing said input code signal upon each application thereof, a memory for constantly memorizing said constant code signal, and an identity detector, connected to said register and said memory, for generating an output signal when said input code signal is detected to be identical with said constant code signal, said output signal allowing said control means to generate said control signal.

2. An engine control system according to claim 1, wherein said packaged electric control device includes:
   a timing control circuit for generating an output signal which determines the ignition timing of said engine; and
   an output transistor, connected to said timing control circuit via said checkup circuit, for generating said control signal in response to said output signal, said checkup circuit applying said output signal to said output transistor only when said two code signals are identical.

3. An engine control system according to claim 1, wherein said packaged electric control device includes:
   a pulse computer circuit for generating a pulse signal which determines the fuel injection amount; and
   an output transistor, connected to said pulse computer circuit via said checkup circuit, for generating said control signal in response to said pulse signal, said checkup circuit applying said pulse signal to said output transistor only when said two code signals are identical.

4. An engine control system having an input code checkup function comprising:
   an electric power source;
   a packaged electric control device having an input terminal connected to said electric power source and an output terminal, and adapted to generate a control signal at said output terminal for electrically controlling the operation of an engine, said packaged electric control device including an integrally packaged ignition coil for generating an ignition signal only when the electric power of said power source is applied thereto; and
   a checkup circuit, integrally provided within said packaged electric control device and connected between said input and output terminals, for comparing an input code signal with a predetermined constant code signal, said checkup circuit allowing said packaged electric control device to generate said control signal at said output terminal only when said two code signals are identical, said checkup circuit including a switch circuit connected between said input terminal and said ignition coil for applying said electric power to said ignition coil only when said two code signals are identical, a register for temporarily memorizing said input code signal upon each application thereof, a memory for constantly memorizing said constant code signal, and an identity detector, connected to said register and said memory, for generating an output signal when the identity between said two code signals memorized by said register and said memory is detected, said output signal rendering said switch circuit conductive so that said electric power is applied to said ignition coil.

* * * * *